United States Patent Office

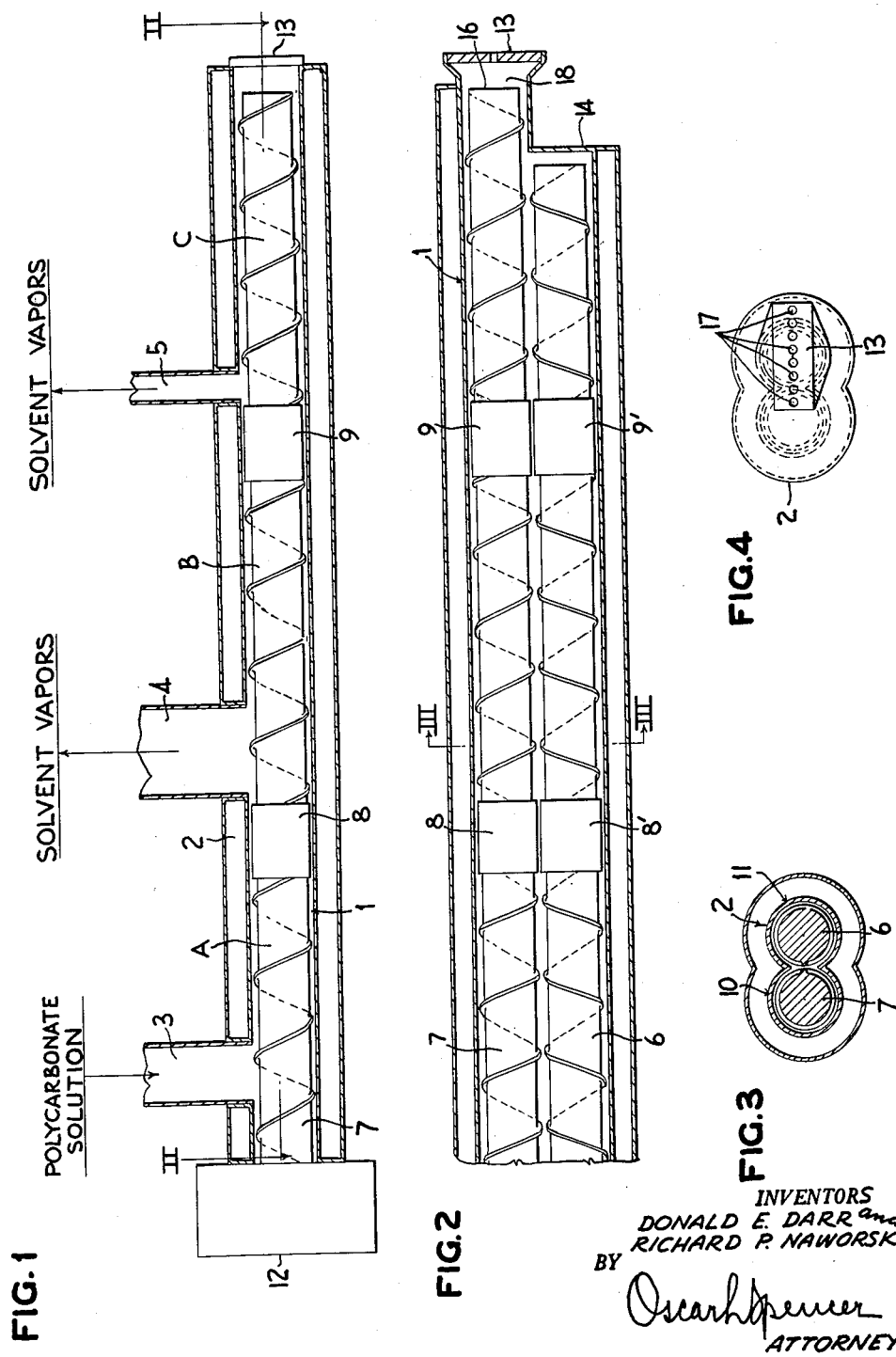

3,022,271
Patented Feb. 20, 1962

3,022,271
FINISHING OF SOLID DIPHENOLIC
POLYCARBONATES
Donald E. Darr, Pittsburgh, Pa., and Richard P. Nawor-
ski, Barberton, Ohio, assignors, by mesne assignments,
to Pittsburgh Plate Glass Company
Filed Aug. 10, 1960, Ser. No. 48,733
8 Claims. (Cl. 260—47)

This invention deals with the manufacture of poly- carbonates, notably high molecular weight polycarbon- ates such as Bisphenol A polycarbonates. More particu- larly, it involves providing high molecular weight poly- carbonates in a convenient physical form.

High molecular weight polycarbonates may be pre- pared by the phosgenation of alkylidene bisphenols such as Bisphenol A (p,p'-isopropylidene diphenol). Espe- cially good results ensue by conducting the phosgenation in a heterogeneous reaction medium comprised of an aqueous phase and an organic phase. Results are par- ticularly gratifying when the organic phase is provided by incorporating in the reaction medium an essentially water insoluble organic solvent for the polycarbonate. As a consequence, the polycarbonate product is obtained initially as solute in the organic solvent.

Many polycarbonate uses and economic considera- tions dictate recovery of the polycarbonate from such solution in solid state and especially in the form of particles. Illustrative is in molding applications of the polycarbonate where molding powders are required. Moreover, even with the better organic solvents for the polycarbonates it is rare that the polycarbonate com- prises substantially more than 30 or 40 percent by weight of the solution. Hence, shipping costs based upon the weight of product transported are high for solutions.

There are still further advantages and conveniences in the shipping, storage and handling of solids rather than solutions. Particulate solid compositions may be bagged while liquids require drumming or the like. Many, if not all, of the better solvents for high molecular weight polycarbonates are rather volatile, necessitating appropri- ate precautions.

For these and other reasons, it is for many purposes compelling that the high molecular weight polycarbonate be provided as a solid composition, particularly as a solid particulate composition.

According to the present invention high molecular weight polycarbonates may be recovered efficiently and simply from solution as a solid composition and if de- sired as small particles. These particulate compositions are of commendably high bulk density, a desirable char- acteristic.

A process has hereby been provided for preparing from organic solutions solid compositions of high mo- lecular weight polycarbonates. It entails controllably volatilizing the solvent from the solution, under suitable pressure and temperature, until substantially all solvent is removed and thereafter extruding the remaining poly- carbonate in molten form. This is done while main- taining the polycarbonate in a liquid state. Extruded products may be mechanically subdivided into a particu- lated composition of high bulk density.

As solvent is removed, the composition is transformed from a solution to a solvated gel and finally to an es- sentially solvent free but liquid (or molten) state. With many solvents, especially the more volatile solvents, re- moval of a preponderant portion, often between 80 and 90 percent by weight of solvent will occur under mod- erate conditions. Removing the remaining portion of solvent is more difficult. Generally, subatmospheric pressures of 20 to 400 millimeters mercury pressure or less and elevated temperatures are relied upon for this purpose.

During the transformation of the solution into a liquid solvated gel and then to a solvent-free non-solid com- position (by volatilization and removal of solvent), the polycarbonate residue becomes increasingly difficult to transport or handle. Temperatures and special mechani- cal techniques are therefore utilized to provide and present polycarbonate in an extrudable form to an ex- trusion die. Usually, polycarbonate is in the latter stages molten or plastic and also kneaded mechanically.

In the course of transforming the polycarbonate from its initial state as solute in an organic solution to molten (essentially solvent-free) state for extrusion or like me- chanical working, conditions are such as to avoid solidi- fication or gelling of the polycarbonate into an un- manageable mass. The polycarbonate compositions un- dergoing such transformation are thus maintained at a thermal state, e.g., temperature and heat content, con- sistent with such objectives and other conditions pre- vailing during the transformation.

According to a typical practice, this invention entails the sequential transformation of a liquid polycarbonate solution ultimately to an essentially solvent-free molten liquid polycarbonate composition. In this treatment, the polycarbonate (as a solution, solvated gel and ulti- mately a molten mass) is maintained in a liquid or flowable (non-solid) state. This is most effectively ac- complished by providing in a proper sequence a plu- rality of zones through which the polycarbonate is moved along a defined path. In this manner, an organic poly- carbonate solution is presented to a volatilization zone wherein up to about 98 percent by weight of solvent initially present (e.g., 70 to 98 percent) is removed, the resulting solvent poor polycarbonate composition in liquid state is passed to another zone wherein a major portion, usually substantially all, the remaining solvent is removed and the residue of essentially solvent-free polycarbonate is thereafter in molten form passed to an extrusion zone. The process, accordingly, is performed by providing a forwardly moving stream of polycar- bonate in liquid state (solution, liquid gel and melt) which is sequentially treated as described. In essence, a polycarbonate solution is transformed into molten sol- vent-free polycarbonate and extruded while the poly- carbonate is in liquid state.

More particularly, and in accordance with a preferred embodiment hereof, the polycarbonate is heated to an elevated temperature (usually above that at which the polycarbonate is molten) without substantial volatiliza- tion of solvent. After being so heated, the principal por- tion (up to 98 weight percent) of the solvent is volatilized at a temperature substantially above the normal boiling point of the solvent (e.g., under superatmospheric pres- sure. In addition, this removal of the solvent is accom- plished while maintaining the residual composition in liquid state. Thereafter, essentially all of the remaining solvent is removed by vaporization at subatmospheric pressures, often below 50 millimeters mercury of pressure. The solvent-free or near solvent-free polycarbonate in molten state is then extuded. Each of the foregoing treat- ments accomplished under the specified conditions may be performed in one or more individualized zones.

Obviously, the precise conditions (consistent with con- ducting the foregoing treatments such as temperature and pressure) are variable depending, for example, upon the particular solvent and polycarbonate. For example, with lower melting polycarbonates the necessary temperatures are more moderate than with higher melting polycarbon- ates. Temperatures are selected so as to preclude any significant thermal degradation of polycarbonate. Also, more vigorous conditions of vacuum and temperature are in order in removing latter portions of less volatile solvents than with more volatile solvents.

Special apparatus designed to provide zones through which to move sequentially a stream of polycarbonate solution to remove solvent therefrom and ultimately to extrude molten polycarbonate facilitates performance of the process. Such apparatus typically includes an elongated chamber, one end of which communicates with a feed means. An extrusion section such as an extrusion die (or nose plate) terminates the other extremity of the chamber. Intermediate the two extremities are means for applying pressure and vacuum (as may be required) and controlling the temperature. Ports are provided for withdrawal of solvent vapors. Within the chamber and providing for the forward movement of the composition are mechanical means such as one or more screws appropriately mounted to impel forwardly liquid polycarbonate compositions from the inlet end towards and through the extruder. These screws force the liquid polycarbonate composition forwardly, even when it is highly viscous as when polycarbontae is molten. During the volatilization of solvent, these screws work and knead the residual polycarbonate composition in the chamber facilitating its handling and forward movement to the extruder.

As extruded, the essentially solvent-free polycarbonate may take a variety of shapes and forms. Thus, the extrusion die may be of any configuration. Products extruded in spaghetti-like form or as long relatively thin products having triangular, rectangular or circular cross-section areas are the more common. The long string-like extruded materials are preferably chopped, cut or otherwise mechanically subdivided into smaller solids, the maximum size of which is on the order of 1 or 2 inches. This subdivision is ideally performed after air cooling the extruded material to an ambient temperature. It is also possible to subdivide mechanically the material as it emerges from the extrusion die as by hot chopping.

The performance of this invention may be clearly understood by reference to the drawing which schematically illustrates appropriate apparatus.

In the drawing:

FIGURE 1 is a schematic vertical longitudinal section of the apparatus;

FIGURE 2 is a schematic horizontal section lengthwise of the apparatus;

FIGURE 3 is a vertical cross-section of the apparatus; and

FIGURE 4 is a front view of the nose plate.

The apparatus includes a main barrel 1 which comprises a pair of cylindrical bores 10 and 11 surrounded by heating bath 2 provided with ports 3, 4 and 5 in communication with the barrel. Rather than being a single heating bath, bath 2 may be comprised of a plurality of baths each of which may be individually controlled. Barrel 1 has the configuration illustrated in FIGURE 3. In the bores of barrel 1, worm flights 6 and 7 are mounted in the general relationship illustrated in the figures with the flight of one worm set midway between the flight of the adjacent worm. In the designated points, the worm flights are interrupted by cylindrical pressure blocks 8, 8', 9 and 9'. These worm flights are driven by motor and gearing arrangement 12.

In performing this invention, a liquid solution of polycarbonate, e.g., a methylene chloride solution of Bisphenol A polycarbonate, is preheated and introduced into heating zone A of main barrel 1 through feed port 3. Zone A extends from adjacent feed port 3 up to pressure blocks 8 and 8'. In zone A, this polycarbonate solution is raised to a temperature above the melting point of the polycarbonate solute and is propelled forwardly by the screw flights to pressure blocks 8 and 8'. In operation, the clearance between the inner surface of barrel 1 and these pressure blocks is continuously filled with polycarbonate solution so that heating zone A is sealed from ensuing zones.

After being appropriately heated in zone A, the polycarbonate solution, by action of the rotating worms, is forced forwardly past pressure blocks 8 and 8' into vaporization zone B. Vaporization zone B, as illustrated, comprises that portion of main barrel 1 between facing ends of pressure block pair 8 and 8' and pressure block pair 9 and 9'. In zone B, methylene chloride or like solvent is vaporized and vapors are withdrawn through solvent removal port 4 under superatmospheric pressure. In zone B, up to 98 percent by weight of the solvent in the feed solution is removed by vaporization at superatmospheric pressures, typically at a pressure above 100 pounds per square inch gauge. These vapors may be condensed and recovered, for example, for use as the solvent component of the reaction medium in which further polycarbonate is prepared.

The resulting solvent-lean polycarbonate composition is moved forwardly by the worms past pressure blocks 9 and 9' (which isolate zone B and zone C) into zone C. In zone C, the polycarbonate composition is depleted by volatilization and removal via port 5 thereof of essentially all the remaining solvent under subatmospheric pressure, usually at pressures of less than 400, ideally between 5 and 60, millimeter mercury. Other volatiles which may be present are also removed via port 5, such as solvent degradation products and possibly low molecular weight polycarbonate components or degradation products. The space between pressure blocks 9 and 9' and the inner surface of barrel 1 is, accordingly, filled with polycarbonate to isolate and permit the different pressures prevailing in zones B and C.

Rotation of worms 6 and 7 in zone C continues to move polycarbonate (now in molten state) forward ultimately presenting the composition to an extrusion section and nose plate 13. The molten polycarbonate is thus extruded through nose plate 13 in any convenient configuration.

Zone C and the bores which comprise it terminate as illustrated in FIGURE 2. Thus, one bore and the screw flight therein terminate before the other at 14. In the other bore, the other worm flight extends further as shown, providing an extrusion or pumping zone, ultimately leading to the die holder which widens out. Nose plate 13 is mounted at this widened end of the die holder as illustrated in FIGURE 4. Extrusion is made through holes 17 communicating with extrusion die feed zone 18.

Throughout its movement along main barrel 1, the polycarbonate compositions are at such temperatures that they remain in liquid state. This usually requires heating, especially due to the cooling effect of vaporization. Heat is supplied by oil bath 2, or other heat transfer expedients. Insulation of the apparatus to minimize heat losses is good practice.

The depth of worm flights 6 and 7 (i.e. worm roots) are so designed that the available volume for the polycarbonate composition within main barrel 1 diminishes along the line of polycarbonate flow therethrough to take into account the decrease in volume of the polycarbonate. Thus, in zone A, more volume is available for polycarbonate than in zone C because due to solvent removal the composition in the apparatus has decreased. Usually, this difference in available volume is provided by varying the depth of the worm threads, e.g., a larger or smaller diameter worm shaft.

Except for the spaces between the pressure blocks and inner surface, the polycarbonate composition does not fill completely the available volume. This is especially true in zones B and C. This allows vapors to flow through the clearance between the worm threads and inner surface of barrel countercurrently to the flow of polycarbonate and out port 4 or 5. The configuration and interrelationship of the worm flights when the apparatus is functioning properly moves the non-gaseous materials, e.g., the liquid polycarbonate compositions, forwardly without substantial and significant backflow.

Ultimately, after being substantially freed of solvent, the polycarbonate is extruded through nose plate 13 ideally in a spaghetti-like shape. Usually, a multiplicity of polycarbonate strands are simultaneously extruded, e.g., the nose plate has a plurality of circular orifices through which polycarbonate is extruded. As it leaves the nose plate, the polycarbonate is generally at temperatures above its softening point.

In a preferred procedure, the strands of polycarbonate emanating from nose plate 13 are passed along a perforated surface of a cooling table. Air or other inert gaseous coolant (ideally free of dust or other particles) is passed upwardly through the perforations to cool the polycarbonate. In most instances, gaseous coolant at ambient temperatures is sufficiently cool although refrigerated coolant may be used, especially when available contact time may be insufficient to accomplish adequate cooling with warmer gas.

Especially as they emanate from the nose plate and are still quite hot, the strands of polycarbonate are maintained apart, and moved over the cooling table surface usually spaced parallel from one another. These strands, after being cooled, are wound upon a rotating receiving drum at an end of the table remote from the nose plate, or more frequently, pulled forward onto a rotating drum and mechanically subdivided (by cutting) into pellets.

In most instances, the rotating drum draws the strands along the cooling surface. This places some tension upon the strands. While the polycarbonate is still hot enough, as when the strands initially leave the nose plate, the tension stretches (elongates) the strands causing some reduction in the strand cross-section diameter.

Among the polycarbonate solutions converted to solid polycarbonate compositions in accordance with this invention are those obtained in connection with the phosgenation of appropriate diols in a heterogeneous liquid reaction medium to produce polycarbonates. Organic solvents are an important component of such reaction media and provide the organic phase of this heterogeneous medium. Solvents used in such phosgenation are essentially water insoluble (immiscible) chemically inert solvents for the polycarbonate. Among the especially effective solvents are the normally liquid partially halogenated aliphatic hydrocarbons of 1 to 4 carbon atoms, especially the chlorinated aliphatic hydrocarbons, including chloroform, methyl chloride, methylene chloride, ethylene chloride, beta,beta'-dichloroethyl ether, acetylene dichloride, dichloroethylene and the dichlorobutanes. Solutions of polycarbonate in these solvents are effectively handled by this invention.

However, the invention is appropriate for recovering solid polycarbonate solute from any organic solvent. Besides solvents above enumerated, solutions include those formed from organic solvents in which the high molecular weight polycarbonate in question is soluble to a reasonable extent, e.g., solvents capable of dissolving at least about 3 percent polycarbonate by weight of the solvent. Solutions may be constituted of mixtures of two or more such solvents. Among the other solvents are 1,4-dioxane, ketones, such as acetone, isobutyl ketone, tetrahydrofuran, benzene, the xylenes and the like.

One of the classes of polycarbonates with which the present invention has particular relevance is the alkylidene bisphenol polycarbonates such as Bisphenol A polycarbonate. A polycarbonate of this type may be prepared by way of illustration by phosgenating a reaction medium formed from an alkylidene bisphenol, an aqueous alkali metal hydroxide solution and a water insoluble organic solvent for the polycarbonate, notably a partially chlorinated aliphatic hydrocarbon such as methylene chloride. This leads to a methylene chloride solution of high molecular weight alkylidene bisphenol polycarbonate which after separation from the balance of the reaction medium (and purification along with concentration if desired) is treated in accordance with the present invention to obtain the polycarbonate in the form of solid particulate compositions. Usually, it is most desirable that the solution be essentially free of water, e.g., anhydrous, for all practical purposes.

Such methylene chloride polycarbonate solution or like solution, usually after suitable purification such as water washing, removal of any water and preferably containing between 5 and 30 percent by weight of polycarbonate (dilution or concentration of the reaction medium organic component as may be necessary) is forwarded to apparatus such as illustrated in the drawing and described hereinbefore. Usually, the solution is preheated (say to 70° C. to 100° C.) prior to actually entering the inlet end of the apparatus, and is in the apparatus heated further to temperatures above the softening point of polycarbonate, e.g., on the order of 200° C. to 300° C. in the case of Bisphenol A polycarbonate.

Once at such temperature, at least about 80 percent and usually 93 to 95 percent by weight of the solvent initially present is vaporized in a zone under superatmospheric pressures of above 100, usually at least 140 pounds per square inch gauge, and removed at temperatures substantially above the solvent's normal boiling temperature. The balance of the solvent is removed under subatmospheric pressure, usually pressures of 20 to 100 millimeters mercury. The residue in molten form is then extruded or otherwise converted to suitable solid form. Throughout, the polycarbonate composition is maintained in liquid (including molten) state.

The following example illustrates one application of the present invention:

*Example I*

An essentially anhydrous methylene chloride solution of high molecular weight Bisphenol A polycarbonate having a K-value of 58 (in dioxane solution) and containing 26 percent polycarbonate by weight of the solution was converted to solid product in a twin screw Welding Engineers, Inc. extruder.

This apparatus was comprised of an elongated heated chamber in which a pair of "two inch" diameter screws were mounted. At one end of the chamber, the methylene chloride solution at about 60° C. was introduced at the rate of 50 pounds per hour with the dual screws rotating to impel forwardly the material toward the die. The other end of the chamber terminated in an extrusion die. About midway between these extremities, methylene chloride vapors were withdrawn from the chamber at atmospheric pressure. Approximately 95 percent of the methylene chloride was removed in this manner.

The balance of the methylene chloride was withdrawn through a port between the first withdrawal point and die under a vacuum of 200 millimeters mercury pressure. Meanwhile, by heating in the chamber the temperature of the polycarbonate therein was raised to about 280° C. after removal of all the solvent. At this temperature, the polycarbonate was extruded tthrough the die in five spaghetti-like rods of one-eighth inch in cross-sectional diameter.

Some of this extruded material thereafter was chopped into granular particles approximately one-eighth inch in diameter.

The following example illustrates performance of the preferred embodiment of this invention:

*Example II*

In this example, the apparatus diagrammatically illustrated in the drawing was employed to produce 50 pounds per hour of Bisphenol A polycarbonate pellets ($3/32$ inch in diameter) from 200 pounds per hour of a methylene chloride solution containing 25 weight percent Bisphenol A polycarbonate having a K-value of 50 (in dioxane solution).

Main barrel 1 in the specific apparatus used to accomplish this was approximately 6 feet long, comprising a pair of cylindrical bores (as shown in FIGURE 3) each of which was 2 inches in diameter. As illustrated in the drawing, the barrel contained worm flights and pressure bars mounted in each bore along the length of the barrel. Clearance between the inner surface of the barrel and both the pressure bars and outermost extremities of the worm threads was about 0.006 of an inch.

Each of the pressure bars 8, 8′, 9 and 9′ was 3 inches long, while zone A was 17 5/16 inches long, zone B was 21 inches long and zone C was 22½ inches long. One bore of zone C and the worm flight therein was about 6¼ inches shorter than the other. In the longer bore, the last 12 inches of the worm flight were such as to pump the contents to a die feed zone 18 which zone terminated in a die holder of a diameter of 3 inches. A nose plate with eight holes 3/32 of an inch in diameter was mounted on the outer face of the die holder as illustrated in the drawing.

Over an extended period of operation, polycarbonate pellets were produced at the specified rate while rotating the worm flights at 150 revolutions per minute. The methylene chloride solution of polycarbonate was electrically preheated to 82° C. in insulated tubular port 3 (3½ inches inner diameter) and introduced into heating zone A. Surrounding zone A, oil bath 2 was at a temperature of 270° C. to 295° C., while the barrel temperature in zone A was about 215° C.

As already described, from zone A the heated solution moved forward into zone B wherein a pressure of 140 pounds per square inch gauge prevailed. Oil bath temperatures surrounding zone B were 235° C. to 260° C. The barrel temperature was about 238° C. Some 93 to 95 percent by weight of the fed methylene chloride was removed under this pressure from zone B through port 4.

From zone B, the remaining polycarbonate was forced past pressure blocks 9 and 9′ into zone C operated under 24 to 34 millimeters mercury pressure and nearly all the remaining methylene chloride was vaporized and withdrawn from the polycarbonate which was then a molten mass. This molten mass was then extruded through the eight holes in nose plate 13 to provide eight continuous strands. Leaving the nose plate, the polycarbonate temperature was 288° C. (measured by pyrolytic means).

These strands were then in parallel passed along the perforated surface of a 20 foot long cooling table through which perforations dust free air at atmospheric temperature was blown to cool the strands. At the other extremity of the table, the strands cooled to atmospheric temperature were drawn into a rotating run and cut into appropriate sized pellets, typically pellets of about a ¼ inch maximum dimension.

It is of course possible to use other techniques for subdividing and cooling the extruded polycarbonates. However, air or like gas cooling prior to subdividing mechanically, it has been found, is particularly useful and provides highest quality products. Less preferable, but feasible, is the hot chopping of the strands (as they emerge from the nose plate) followed by water cooling.

Any solution of the higher molecular weight products generically characterized as polycarbonates (typical molecular weights ranging from 800 to 40,000 or more) are treatable by this invention to realize solid particulate compositions. The most noteworthy of the present polycarbonates are the alkylidene bisphenol polycarbonates, notably Bisphenol A polycarbonates. This invention is especially useful in handling organic solutions of such polycarbonates and particularly those prepared by phosgenation of the following or like alkylidene bisphenols:

(4,4′-dihydroxy-diphenyl)-methane
2,2-bis(3,3′-dimethyl-4,4′-dihydroxy-diphenyl)-propane
1,1-(4,4′-dihydroxy-diphenyl)-cyclohexane
2,2′-methylene bis(4-methyl-6-tertiary butyl phenol)
2,2′-methylene bis(4-ethyl-6-tertiary butyl phenol)
4,4′-butylidene bis(3-methyl-6-tertiary butyl phenol)
4,4′-thiobis(3-methyl-6-tertiary butyl phenol)
1,1-(4,4′-dihydroxy-3,3′-dimethyl-diphenyl)-cyclohexane
2,2-(2,2′-dihydroxy-4,4′-di-tert-butyl-diphenyl)-propane
3,4-(4,4′-dihydroxy-diphenyl)-hexane
1,1-(4,4′-dihydroxy-diphenyl)-1-phenyl-ethane
2,2-(4,4′-dihydroxy-diphenyl)-butane
2,2′-(4,4′-dihydroxy-diphenyl)-pentane
3,3′-(4,4′-dihydroxy-diphenyl)-pentane
2,2′-(4,4′-dihydroxy-diphenyl)-3-methyl-butane
2,2′-(4,4′-dihydroxy-diphenyl)-hexane
2,2′-(4,4′-dihydroxy-diphenyl)-4-methyl-pentane
2,2′-(4,4′-dihydroxy-diphenyl)-heptane
4,4-(4,4′-dihydroxy-diphenyl)-heptane
2,2-(4,4′-dihydroxy-diphenyl)-tridecane
2,2-bis(3,5-dichloro-4-hydroxy phenyl)-propane
2,2-bis(tetrachloro hydroxy phenyl)-propane
2,2-bis(3-chloro-4-hydroxy phenyl)-propane Moreover, the polycarbonates may be prepared using mixtures of two or more such alkylidene bisphenols.

Besides these and like bisphenol polycarbonates, polycarbonates of other polyhydroxy, notably dihydroxy, benzenes or naphthalenes may be used herein. Typical polyhydroxy compounds of this character include: catechol, resorcinol, quinol, orcinol, mesorcinol, dihydroxyxylol, thymoquinol; naphthalene diols such as 1,3-dihydroxynaphthalene, 1,8-dihydroxynaphthalene, 1,6-dihydroxynaphthalene, 2,7-dihydroxynaphthalene; dihydroxydiphenyls such as 2,5-dihydroxydiphenyl, 2,2′-dihydroxydiphenyl, 2,4′-dihydroxydiphenyl, 3,3′-dihydroxydiphenyl, 4,4′-dihydroxydiphenyl, 3,4-dihydroxydiphenyl; aralkyl diols such as xylylene glycols including phthalyl alcohol, metaxylylene glycol, paraxylylene glycol; the dimethylxylylene glycols such as alpha,alpha-dihydroxydurene and styryl glycol.

Furthermore, organic solutions of mixed polycarbonates such as those derived from combinations of various polyhydric, particularly dihydric, aliphatic or cycloaliphatic diols with aromatic diols such as bisphenols are converted into solid compositions as herein contemplated. Polycarbonates provided by the simultaneous phosgenation of Bisphenol A or like alkylidene bisphenol and an aliphatic of cycloaliphatic diol are an example. Also, the higher molecular weight polycarbonates provided, for example, by reaction of a bischloroformate of an aliphatic diol and an aromatic diol such as Bisphenol A or catechol in organic solution are usefully transformed into the solid polycarbonate compositions.

Aliphatic dihydric alcohols principally aliphatic diols may be admixed with an aromatic diol (e.g. bisphenol) to provide an essentially linear polycarbonate having alternating aromatic and aliphatic residues separated by carbonate linkages. Among the dihydric compounds are the saturated, acyclic dihydric alcohols (glycols), typical of which are ethylene glycol, propanediol-1,2, butanediol-1,3, butanediol-2,3, butanediol-1,2, butanediol-1,4, diethylene glycol, triethylene glycol, tetraethylene glycol, dipropylene glycol, tripropylene glycol, dibutylene glycol, tetrabutylene glycol and olefinically unsaturated dihydric alcohols such as 3-butenediol-1,2. Polyglycols containing from 1 to 4 ether linkages and/or up to 12 carbon atoms as well as the corresponding thioglycols such as thiodiglycol, ethylene thiodiglycol are included. Aralkyl diols in which the hydroxyl groups are linked to the alkyl substituents are also useful in lieu of or in combination with the aliphatic or cycloaliphatic diols.

Among the cycloaliphatic diols used with aromatic diols in the preparation of mixed polycarbonates which when in organic solution are herein treatable are: 1,2-cyclohexanediol, 1,3-cyclohexanediol, 1,4-cyclohexanediol, 1-methyl-cyclohexanediol-2,3, 1,2-cyclopentanediol, 1,3-cyclopentanediol, 3,3′-dihydroxydicyclopentyl ether, hydrogenated alkylidene bisphenols illustrated by 4,4′-dihydroxydicyclohexyl-2,2-propane and 1,2-dihydroxy-4-vinylcyclohexane.

Mixed polycarbonates, i.e. polycarbonates derived from both an aromatic diol and a cycloaliphatic or aliphatic diol usefully handled according to this invention, may be derived from varying ratios of the respective diols. Included are mixed polycarbonates regarded as having the more interesting properties which are principally derived from mixtures in which the aromatic diol constitutes between 25 and 90 mole percent of the diol mixtures. Other polycarbonates may be derived from a mixture of diols in which the aromatic diol comprises as low as 5 or 10 percent of the diol.

This application is a continuation-in-part of Serial No. 751,185, filed July 28, 1958.

While the invention has been described by reference to specific details of certain embodiments, it will be understood that it is not intended the invention be construed as limited to such details except insofar as they appear in the appended claims.

We claim:

1. A method of recovering solid polycarbonate of a diphenol from solution in inert solvent normally boiling below the temperature at which the polycarbonate is flowable which comprises heating the solution to volatilize solvent therefrom and raise the solution to a temperature at which the polycarbonate is flowable while maintaining superatmospheric pressure upon the solution sufficient to control the volatilization so as to retain with the polycarbonate sufficient solvent to keep the polycarbonate-solvent mixture flowable until attaining a temperature at which the polycarbonate is flowable and thereafter extruding the solvent-lean flowable polycarbonate.

2. The method of claim 1 wherein the polycarbonate is a polycarbonate of an alkylidene bisphenol.

3. The method of claim 1 wherein the polycarbonate is a polycarbonate of p,p'-isopropylidene diphenol.

4. The method of claim 1 wherein the inert solvent is a normally liquid partially halogenated aliphatic hydrocarbon of 1 to 4 carbon atoms.

5. A method of recovering solid polycarbonate of a diphenol from solution in inert solvent normally boiling below the temperature at which the polycarbonate is flowable which comprises heating the solution to volatilize solvent therefrom and raise the solution to a temperature at which the polycarbonate is flowable, maintaining superatmospheric pressure upon the solution sufficient to control the volatilization so as to retain with the polycarbonate sufficient solvent to keep the polycarbonate-solvent mixture flowable until attaining a temperature at which the polycarbonate is flowable and volatilizing a major portion of the solvent, volatilizing further solvent at subatmospheric pressure while maintaining the polycarbonate flowable and thereafter extruding the solvent-lean flowable polycarbonate.

6. The method of claim 5 wherein the solid polycarbonate is a polycarbonate of an alkylidene diphenol.

7. The method of claim 5 wherein the inert solvent is a normally liquid aliphatic chlorinated hydrocarbon of 1 to 4 carbons.

8. The method of recovering solid p,p'-isopropylidene diphenol polycarbonate from methylene chloride solution which comprises feeding a methylene chloride solution of p,p'-isopropylidene diphenol polycarbonate containing 5 to 30 weight percent p,p'-isopropylidene diphenol polycarbonate to an extremity of a heated elongated zone, establishing a body of polycarbonate moving along the length of the zone controllably volatilizing and withdrawing volatilized methylene chloride from the body along the path of movement until the body is essentially free of methylene chloride while maintaining the residual polycarbonate body flowable throughout its movement through the heated zone, kneading the moving polycarbonate body, extruding the solvent free polycarbonate at 200° C. to 300° C. in molten form and cooling the extruded polycarbonate.

References Cited in the file of this patent

UNITED STATES PATENTS

| | | |
|---|---|---|
| 2,735,840 | Lynch | Feb. 21, 1956 |
| 2,813,137 | Twaddle et al. | Nov. 12, 1957 |

FOREIGN PATENTS

| | | |
|---|---|---|
| 532,543 | Belgium | June 20, 1955 |

UNITED STATES PATENT OFFICE
CERTIFICATE OF CORRECTION

Patent No. 3,022,271                     February 20, 1962

Donald E. Darr et al.

It is hereby certified that error appears in the above numbered patent requiring correction and that the said Letters Patent should read as corrected below.

Column 2, line 55, after "sure" insert a closing parenthesi line 61, for "extuded" read -- extruded --; column 3, line 21, for "polycarbontae" read -- polycarbonate --; column 4, line 24, for "millimeter" read -- millimeters --; column 6, line 57, for "thtrough" read -- through --; column 8, line 33, for "alpha,alpha-" read -- alpha,alpha'- --.

Signed and sealed this 20th day of November 1962.

(SEAL)
Attest:

ERNEST W. SWIDER
Attesting Officer

DAVID L. LADD
Commissioner of Patents